(12) United States Patent
Miller (10) Patent No.: US 11,649,050 B1
(45) Date of Patent: May 16, 2023

(54) UNMANNED AERIAL SYSTEMS HAVING MULTIPLE-PHASE MOTOR CONTROL WITH EMBEDDED DATA COMMUNICATION CIRCUITRY

(71) Applicant: Amazon Technologies, Inc., Seattle, WA (US)

(72) Inventor: Christien Samson Miller, Edmonds, WA (US)

(73) Assignee: Amazon Technologies, Inc., Seattle, WA (US)

(*) Notice: Subject to any disclaimer, the term of this patent is extended or adjusted under 35 U.S.C. 154(b) by 349 days.

(21) Appl. No.: 16/834,911

(22) Filed: Mar. 30, 2020

(51) Int. Cl.
*B64C 39/02* (2006.01)
*G05D 1/08* (2006.01)

(52) U.S. Cl.
CPC ......... *B64C 39/024* (2013.01); *G05D 1/0808* (2013.01); *B64C 2201/027* (2013.01); *B64C 2201/06* (2013.01); *B64C 2201/141* (2013.01)

(58) Field of Classification Search
CPC ............ B64C 39/024; B64C 2201/027; B64C 2201/06; B64C 2201/141; G05D 1/0808
See application file for complete search history.

(56) References Cited

U.S. PATENT DOCUMENTS

| | | | |
|---|---|---|---|
| 10,044,410 B1* | 8/2018 | Lynch | B64C 27/04 |
| 2009/0228223 A1* | 9/2009 | Liu | G01R 31/008 |
| | | | 361/62 |
| 2020/0139823 A1* | 5/2020 | Yan | B60L 15/20 |
| 2020/0218288 A1* | 7/2020 | Johnson | G05D 1/0038 |
| 2020/0233409 A1* | 7/2020 | Scaini | G05D 1/101 |
| 2021/0197977 A1* | 7/2021 | Jenkins | B64C 39/024 |

\* cited by examiner

*Primary Examiner* — Aniss Chad
*Assistant Examiner* — Christine Nguyen Huynh
(74) *Attorney, Agent, or Firm* — Nicholson De Vos Webster & Elliott LLP (57) ABSTRACT

Techniques for an unmanned aerial system that embeds data into power sent from a control system to one or more motors so that one or more wires between the control system and the one or more motors can be used to transmit power and data are described. As one example, an unmanned aerial system includes a sensor, a control system comprising alternating current power generation circuitry and first embedded data communication circuitry, and a motor system coupled to the control system via a set of one or more wires and comprising at least one motor to provide propulsion from power generated by the alternating current power generation circuitry and second embedded data communication circuitry to embed data from the sensor into the power generated by the alternating current power generation circuitry to produce modulated power, wherein the first embedded data communication circuitry is to extract the data from the modulated power. The unmanned aerial system may include a second set of one or more wires dedicated to send the data from the sensor to the control system.

20 Claims, 8 Drawing Sheets

UNMANNED AERIAL SYSTEMS HAVING MULTIPLE-PHASE MOTOR CONTROL WITH EMBEDDED DATA COMMUNICATION CIRCUITRY

BACKGROUND

Historically, vehicle traffic around homes and neighborhoods was primarily limited to automobile traffic. However, the recent development of aerial vehicles, such as unmanned aerial vehicles, has resulted in a rise of other forms of vehicle traffic. For example, hobbyists may fly unmanned aerial vehicles in and around neighborhoods, often within a few feet of a home. Likewise, there is discussion of electronic-commerce retailers, and other entities, delivering items directly to a user's home using unmanned aerial vehicles. As a result, such vehicles may be invited to navigate into a backyard, near a front porch, balcony, patio, and/or other locations around the residence to complete delivery of packages.

BRIEF DESCRIPTION OF DRAWINGS

Various embodiments in accordance with the present disclosure will be described with reference to the drawings, in which.

DETAILED DESCRIPTION

Various embodiments of methods, apparatuses, systems, and non-transitory computer-readable storage media for embedding data within the power supplied to a motor of an unmanned aerial system are described. According to some embodiments, an unmanned aerial system embeds data into power sent from its control system to one or more of its motors so that one or more wires between the control system and the one or more motors can be used to transmit power and data. This can allow for the removal of wires that are dedicated to sending data (e.g., for weight savings) or redundancy for those wires. The data may be from a transducer (e.g., sensor or actuator) of the unmanned aerial system. The data may be output data from a temperature sensor, rotary encoded sensor, or rotational speed sensor of a motor. The data may be embedded into the power signal using frequency modulation of the data, such as frequency-shift keying (FSK).

The following describes the use of the data embedding disclosed herein for an unmanned aerial system, but it should be understood that other usages are possible, for example, manned aerial systems, unmanned or manned automobiles (e.g., cars and trucks), etc.

Figure 1:
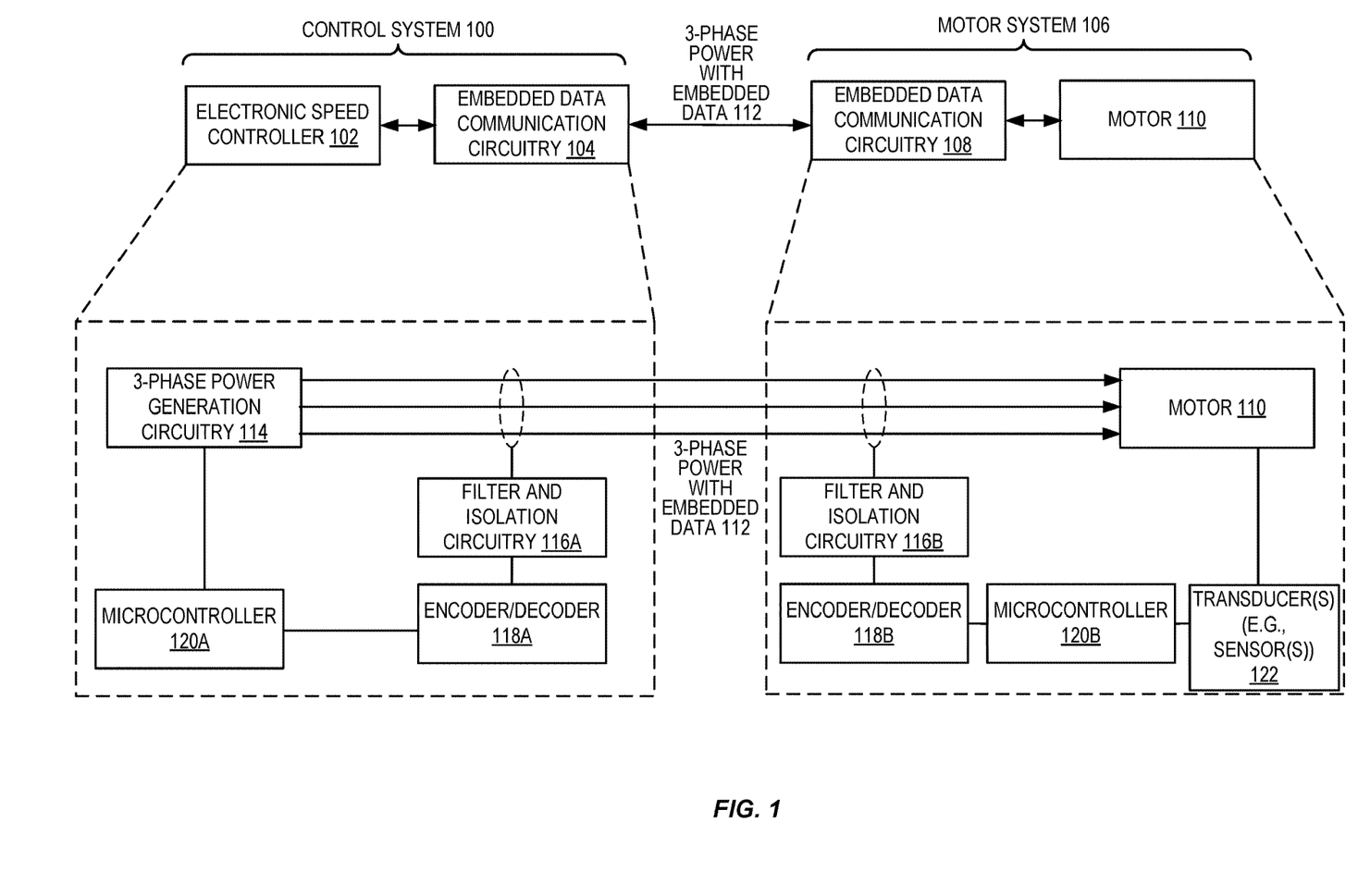
FIG. 1 depicts a control system coupled to a motor system for power with embedded data according to some embodiments.

FIG. 1 depicts a control system 100 coupled to a motor system 106 for (e.g., three-phase) power with embedded data 112 according to some embodiments. In FIG. 1, control system 100 includes an electronic speed controller, for example, to supply a motor 110 of an unmanned aerial system with power commensurate with the desired action (e.g., propulsion). Depicted control system 100 includes embedded data communication circuitry 104 to embed data into power as modulated power 112 and/or extract data from modulated power 112, e.g., embedded data communication circuitry 104 located near one end of the power wires coupling the control system 100 (e.g., electronic speed controller 102) to the motor system 106 (e.g., the motor 110). Depicted control system 100 also includes embedded data communication circuitry 108 to embed data into power as modulated power 112 and/or extract data from modulated power 112, e.g., embedded data communication circuitry 108 located near another end of the power wires coupling the control system 100 (e.g., electronic speed controller 102) to the motor system 106 (e.g., the motor 110). In one embodiment, only one-way communications are possible, e.g., (i) only from control system 100 to motor system 106 or (ii) only from motor system 106 to control system 100. In one embodiment, two-way communications are possible, e.g., (i) from control system 100 to motor system 106 and (ii) from motor system 106 to control system 100.

FIG. 1 further shows an exploded view of an embodiment of components for control system 100 and motor system 106. For example, control system 100 may include multiple (e.g., 3) phase power generation circuitry 114. The multiple (e.g., 3) phase power generation circuitry 114 may be controlled by microcontroller 120A (e.g., as a component of electronic speed controller 102). Microcontroller 120A is coupled to an encoder and/or decoder circuit 118A of control system 100. In certain embodiments, an encoder circuit 118A is to receive data (e.g., binary data that is a series of logical zeros and/or logical ones) that is to be transmitted (e.g., control data for an actuator instance of transducer 122) and modulate that data into the power 112 being transmitted between power generation circuitry 114 and motor 110. In certain embodiments, a decoder circuit 118A is to receive modulated power that is transmitted (e.g., output data for a sensor instance of transducer 122) and is to extract the data (e.g., binary data that is a series of logical zeros and/or logical ones) from the modulated power 112.

Microcontroller 120B is coupled to an encoder and/or decoder circuit 118B of motor system 106. In certain embodiments, an encoder circuit 118B is to receive data (e.g., binary data that is a series of logical zeros and/or logical ones) that is to be transmitted (e.g., output data for a sensor instance of transducer 122) and modulate that data into the power 112 being transmitted between power generation circuitry 114 and motor 110. In certain embodiments, a decoder circuit 118A is to receive modulated power that is transmitted (e.g., control data for an actuator instance of transducer 122) and is to extract the data (e.g., binary data that is a series of logical zeros and/or logical ones) from the modulated power 112.

In certain embodiments, the data is modulated into the (e.g., alternating current) power and/or extracted out of the (e.g., alternating current) modulated power using frequency modulation of the data, such as, but not limited to, frequency-shift keying (FSK). In one embodiment, frequency-shift keying is to use the power as the carrier wave and transmit the data through discrete frequency changes of a carrier signal (e.g., sine wave). The power may have a waveform frequency (e.g., cycles per second) and the binary ones of the data may be modulated to a mark frequency greater than the power frequency, e.g., and the binary zeroes at a space frequency greater than the power frequency but less than the mark frequency. For example, the power may have a waveform frequency of 0 to about 1,000 Hertz (e.g., cycles per second) and the binary ones may be at a mark frequency greater than about 100 kHz (e.g., a mark frequency of about 130 kHz or about 132 kHz), e.g., and the binary zeroes at a space frequency greater than about 100 kHz but less than the mark frequency (e.g., a space frequency of about 133 kHz). It should be understood that the power may be generated by power generation circuitry 114 by pulse width modulation to create the power (e.g., AC) waveform. An example of this is discussed below in reference to FIGS. 4-5.

Optionally, filter and isolation circuitry 116A may be used to filter the waveform on the wires (with coupling circuitry shown as a dotted oval) to/from the encoder and/or decoder circuit 118A. For example, the filter and isolation circuitry 116A may remove any of the waveform of the data that is within the operating frequency (e.g., power frequency) of the motor 110 for data of modulated data in power 112 being sent to the motor 110, e.g., so as to not interfere with the operation of the motor 110. As another example, the filter and isolation circuitry 116A may remove any of the waveform of the data that is within the operating frequency (e.g., power frequency) of the motor 110 for data of modulated data in power 112 being sent from the motor system 106, e.g., to remove the data from the modulated power. Optionally, filter and isolation circuitry 116B may be used to filter the waveform on the wires (with coupling circuitry shown as a dotted oval) to/from the encoder and/or decoder circuit 118B. For example, the filter and isolation circuitry 116B may remove any of the waveform of the data that is within the operating frequency (e.g., power frequency) of the motor 110 for modulated data within power being sent to the motor 110, e.g., so as to not interfere with the operation of the motor 110. As another example, the filter and isolation circuitry 116B may remove any of the waveform of the data that is within the operating frequency (e.g., power frequency) of the motor 110 for modulated data within power being sent from the motor system 106 to control system 100, e.g., to remove the data from the modulated power.

Coupling circuitry (shown as dotted ovals) may be a passive coupling (e.g., including inductor(s), capacitor(s), resistor(s), or any combination thereof) to the power wire(s). Coupling circuitry (shown as dotted ovals) may be an active coupling (e.g., including an operation amplifier (op-amp)) to the power wire(s). Coupling circuitry (shown as dotted ovals) may be one or more radio frequency (RF) transformers located adjacent to the power wire(s).

In an embodiment where there is multiple-phase power, multiple wires (e.g., three or more wires for three-phase power) may be coupled between multiple-phase power generation circuitry 114 and motor 110. In one embodiment, each phase (e.g., each wire corresponding to a phase) is used to transmit a data value, e.g., such that wire one for phase one transmits a first data value, wire two for phase two transmits a second data value, and wire three for phase three transmits a third data value. In one embodiment, a plurality of wires cumulatively transmits a data value, e.g., such that wire one for phase one transmits a first subset of a data value, wire two for phase two transmits a second subset of the data value, and wire three for phase three transmits a third subset of the data value. The data value may be an output value from a sensor or a control value sent to an actuator.

Transducer(s) 122 may be one or more sensors and/or one or more actuators. For example, sensor instance of transducer 122 may include a temperature sensor, rotary encoded sensor, or rotational speed sensor of a motor.

The following is an example operations flow for sending temperature data from a temperature sensor instance of transducer 122 to control system 100. In this example, the temperature data for the motor is read from temperature sensor instance of transducer 122, the temperature data is modulated (e.g., via FSK) at a frequency(ies) compatible with existing power frequencies (e.g., above drive signals and PWM frequency), the modulated data is coupled to the PWM inverter drive signal (e.g., via capacitive coupling circuitry shown as a dotted oval) (and optionally using isolation and filtering) to generate power with embedded data 112, and the data is extracted from the modulated power 112 by decoupling the data from the PWM inverter drive signal. In this example, the extracted temperature data may then be read by control system 100.

Figure 2:
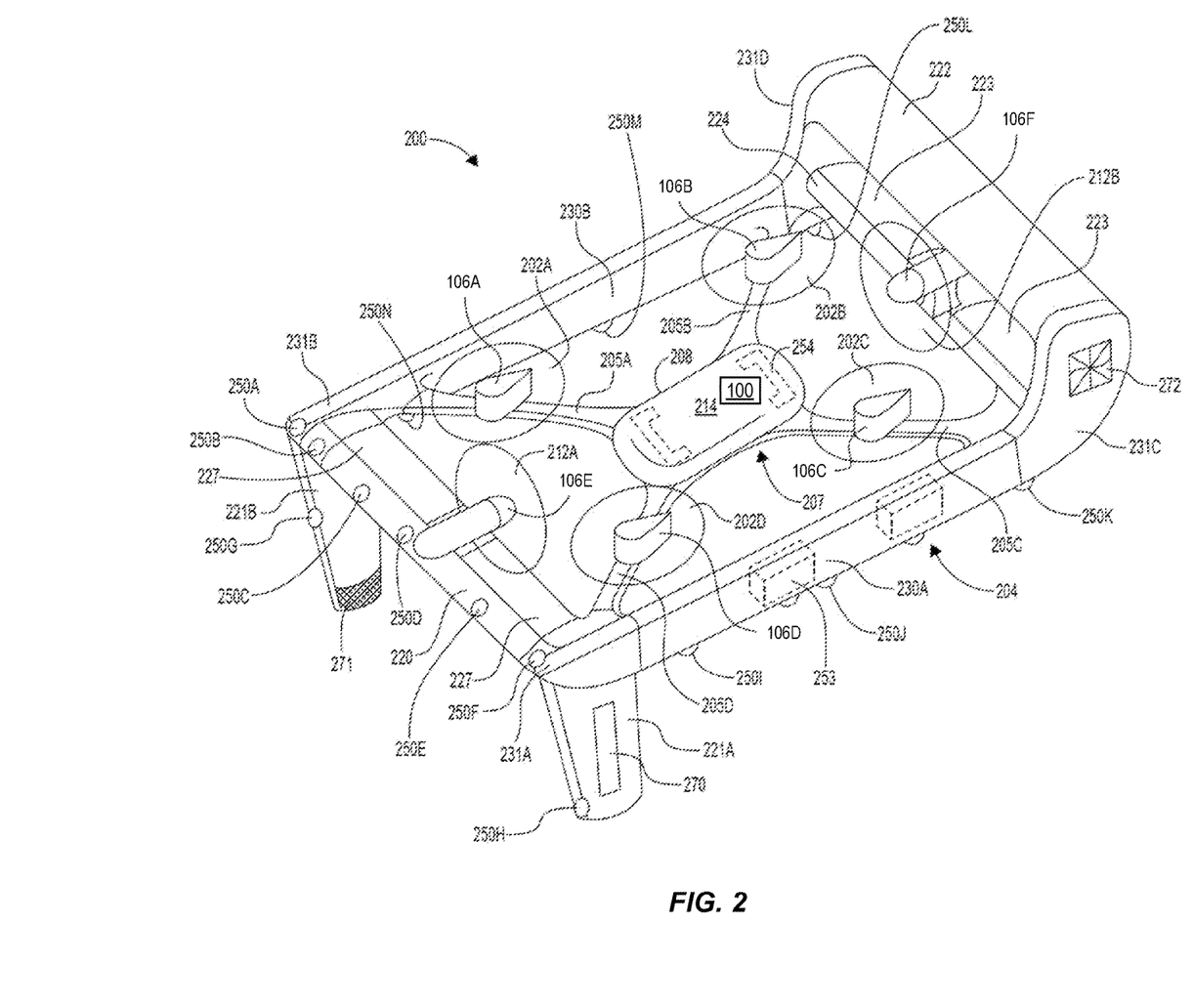
FIG. 2 depicts an unmanned aerial system including a control system coupled to a motor system for power with embedded data according to some embodiments.

FIG. 2 depicts an unmanned aerial system including a control system 100 coupled to a motor system 106A, 106B, 106C, 106D, 106E, and/or 106F for power with embedded data according to some embodiments.

FIG. 2 depicts an unmanned aerial system 200 according to some embodiments. As illustrated, unmanned aerial system 200 includes one or more environmental/operational transducers 250A-250N (e.g., sensors and/or actuators). Although transducers A through N are depicted, any single or plurality of numbers of transducers (e.g., pair of transmitting actuators and receiving sensors) may be utilized. In certain embodiment, range finding of unmanned aerial system 200 utilizes at least one transducer 250A-250N (e.g., actuator and/or sensor). In certain embodiments, control system 214 of an unmanned aerial system 200 includes component(s) from control system 100 and/or motor system 106 in FIG. 1 according to the disclosure herein. Each motor (e., motors 106A-106F in FIG. 2) may be an instance of motor system 106 in FIG. 1, e.g., controlled by a shared (e.g., single) or respective instance of control system 100. Transducer 122 of motor system 106 from FIG. 1 may be any transducer of unmanned aerial system 200 (e.g., transducers 250A-250N). Transducer 122 of motor system 106 from FIG. 1 may be a sensor associated with the motor (e.g., as discussed in reference to FIG. 3) or another sensor of the unmanned aerial system 200.

Unmanned aerial system 200 includes a perimeter frame 204 that includes a front wing 220, a lower rear wing 224, an upper rear wing 222, and two horizontal side rails 230A, 230B. The horizontal side rails 230A-230B are coupled to opposing ends of the front wing 220 and opposing ends of the upper rear wing 222 and lower rear wing 224. In some implementations, the coupling may be with a corner junction, such as the front left corner junction 231A, the front right corner junction 231B, the rear left corner junction 231C, and the rear right corner junction 231D. In such an example, the corner junctions are also part of the perimeter frame 204.

The components of the perimeter frame 204, such as the front wing 220, lower rear wing 224, upper rear wing 222, side rails 230A, 230B, and corner junctions 231A-231D may be formed of any one or more suitable materials, such as graphite, carbon fiber, aluminum, titanium, etc., or any combination thereof. In one embodiment, the components of the perimeter frame 204 of the unmanned aerial system 200 are each formed of carbon fiber and joined at the corners using corner junctions 231A-231D. The components of the perimeter frame 204 may be coupled using a variety of techniques. For example, if the components of the perimeter frame 204 are carbon fiber, they may be fitted together and joined using secondary bonding. In other implementations, the components of the perimeter frame 204 may be affixed with one or more attachment mechanisms, such as screws, rivets, latches, quarter-turn fasteners, etc., or otherwise secured together in a permanent or removable manner.

The front wing 220, lower rear wing 224, and upper rear wing 222 are positioned in a tri-wing configuration and each wing provides lift to the unmanned aerial system 200 when the unmanned aerial system is moving in a direction that includes a horizontal component. For example, the wings may each have an airfoil shape that causes lift due to the airflow passing over the wings during horizontal flight.

Opposing ends of the front wing 220 may be coupled to a corner junction, such as the front left corner junction 231A and front right corner junction 231B. In some implementations, the front wing may include one or more control surfaces, such as flaps 227 or ailerons, that are used to adjust the pitch, yaw, and/or roll of the unmanned aerial system 200 alone or in combination with the lifting motors 106A-106D, lifting propellers 202A-202D, thrusting motors 106E-106F, thrusting propellers 212A-212B, and/or other control surfaces (e.g., flaps on the rear wings) discussed below. In some implementations, the flaps 227 may also be used as a protective shroud to further hinder access to the lifting propellers 202A-202D by objects external to the unmanned aerial system 200. For example, when the unmanned aerial system 200 is moving in a vertical direction or hovering, the flaps 227 may be extended to increase the height of the protective barrier around a portion of the lifting propellers 202A-202D.

In certain embodiments, the motor(s) (e.g., power to the motor(s)) and/or control surfaces are controlled by the control system 214 of an unmanned aerial system 200 based on the range finding (e.g., based on the determined time delay discussed herein).

In some implementations, the front wing 220 may include two or more pairs of flaps 227, as illustrated in FIG. 2. In other implementations, for example, if there is no front thrusting motor 106E, the front wing 220 may only include a single flap 227 that extends substantially the length of the front wing 220. If the front wing 220 does not include flaps 227, the lifting motors 106A-106D and lifting propellers 202A-202D, thrusting motors 106E-106F, thrusting propellers 212A-212B, and/or flaps of the rear wings may be utilized to control the pitch, yaw, and/or roll of the unmanned aerial system 200 during flight.

Opposing ends of the lower rear wing 224 may be coupled to a corner junction, such as the rear left corner junction 231C and rear right corner junction 231D. In some implementations, the lower rear wing may include one or more flaps 223 or ailerons that may be used to adjust the pitch, yaw and/or roll of the unmanned aerial system 200 alone or in combination with the lifting motors 106A-106D, lifting propellers 202A-202D, thrusting motors 106E-106F, thrusting propellers 212A-212B, and/or the flaps 227 of the front wing. In some implementations, the flaps 223 may also be used as a protective shroud to further hinder access to the lifting propellers 202A-202D by objects external to the unmanned aerial system 200. For example, when the unmanned aerial system 200 is moving in a vertical direction or hovering, the flaps 223 may be extended, similar to the extending of the front flaps 227 of the front wing 220.

In some implementations, the rear wing 224 may include two or more flaps 223, as illustrated in FIG. 2, or two or more pairs of flaps, respectively. In other implementations, for example, if there is no rear thrusting motor 106F mounted to the lower rear wing, the rear wing 224 may only include a single flap 223 that extends substantially the length of the lower rear wing 224. In other implementations, if the lower rear wing includes two thrusting motors, the lower rear wing includes three flaps 223, one on either end of the lower rear wing 224, and one between the two thrusting motors mounted to the lower rear wing 224.

Opposing ends of the upper rear wing 222 may be coupled to a corner junction, such as the rear left corner junction 231C and rear right corner junction 231D. In some implementations, like the lower rear wing, the upper rear wing 222 may include one or more flaps (not shown) or ailerons that may be used to adjust the pitch, yaw and/or roll of the unmanned aerial system 200 alone or in combination with the lifting motors 106A-106D, lifting propellers 202A-202D, thrusting motors 106E-106F, thrusting propellers 212A-212B, and/or other flaps of other wings. In some implementations, the flaps may also be used as a protective shroud to further hinder access to the lifting propellers 202A-202D by objects external to the unmanned aerial system 200. For example, when the unmanned aerial system 200 is moving in a vertical direction or hovering, the flaps may be extended, similar to the extending of the front flaps 227 of the front wing 220 or the flaps 223 of the lower rear wing 224.

The front wing 220, lower rear wing 224, and upper rear wing 222 may be positioned and sized proportionally to provide stability to the unmanned aerial system while the unmanned aerial system 200 is moving in a direction that includes a horizontal component. For example, the lower rear wing 224 and the upper rear wing 222 are stacked vertically such that the vertical lift vectors generated by each of the lower rear wing 224 and upper rear wing 222 are close together, which may be destabilizing during horizontal flight. In comparison, the front wing 220 is separated from the rear wings longitudinally such that the vertical lift vector generated by the front wing 220 acts together with the vertical lift vectors of the lower rear wing 224 and the upper rear wing 222, providing efficiency, stabilization and control.

In some implementations, to further increase the stability and control of the unmanned aerial system 200, one or more winglets 221A-221B, or stabilizer arms, may also be coupled to and included as part of the perimeter frame 204. In the example illustrated with respect to FIG. 2, there are two front winglets 221A and 221B mounted to the underneath side of the front left corner junction 231A and the front right corner junction 231B, respectively. The winglets 221A-221B extend in a downward direction approximately perpendicular to the front wing 220 and side rails 230A-230B. Likewise, the two rear corner junctions 231C, 231D are also formed and operate as winglets providing additional stability and control to the unmanned aerial system 200 when the unmanned aerial system 200 is moving in a direction that includes a horizontal component.

The winglets 221A-221B and the rear corner junctions 231C-231D may have dimensions that are proportional to the length, width, and height of the unmanned aerial system 200 and may be positioned based on the approximate center of gravity of the unmanned aerial system 200 to provide stability and control to the unmanned aerial system 200 during horizontal flight.

Coupled to the interior of the perimeter frame 204 is a central frame 207. The central frame 207 includes a hub 208 and motor arms 205A-205D that extend from the hub 208 and couple to the interior of the perimeter frame 204. In this example, there is a single hub 208 and four motor arms 205A, 205B, 205C, and 205D. Each of the motor arms 205A-205D extend from approximately a corner of the hub 208 and couple or terminate into a respective interior corner of the perimeter frame. In some implementations, each motor arm 205A-205D may couple into a corner junction 231A-231D of the perimeter frame 204. Like the perimeter frame 204, the central frame 207 may be formed of any suitable material, such as graphite, carbon fiber, aluminum, titanium, etc., or any combination thereof. In one embodiment, the central frame 207 is formed of carbon fiber and joined at the corners of the perimeter frame 204 at the corner junctions 231A-231D. Joining of the central frame 207 to the perimeter frame 204 may be done using any one or more of the techniques discussed above for joining the components of the perimeter frame 204.

Lifting motors 106A-106D are coupled at approximately a center of each motor arm 205A-205D so that the lifting motor 106A-106D and corresponding lifting propeller 202A-202D are within the substantially rectangular shape of the perimeter frame 204. In one implementation, the lifting motors 106A-106D are mounted to an underneath or bottom side of each motor arm 205A-205D in a downward direction so that the propeller shaft of the lifting motor that mounts to the lifting propeller 202A-202D is facing downward. In other implementations, as illustrated in FIG. 2, the lifting motors 106A-106D may be mounted to a top of the motor arms 205A-205D in an upward direction so that the propeller shaft of the lifting motor that mounts to the lifting propeller 202A-202D is facing upward. In this example, there are four lifting motors 106A, 106B, 106C, 106D, each mounted to an upper side of a respective motor arm 205A, 205B, 205C, and 205D.

In some implementations, multiple lifting motors may be coupled to each motor arm 205A-205D. For example, while FIG. 2 illustrates a quad-copter configuration with each lifting motor mounted to a top of each motor arm, a similar configuration may be utilized for an octo-copter. For example, in addition to mounting a motor 106A-106D to an upper side of each motor arm 205A-205D, another lifting motor may also be mounted to an underneath side of each motor arm 205A-205D and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 202A-202D to lift the unmanned aerial system 200 and any engaged payload, thereby enabling aerial transport of the payload.

Mounted to each lifting motor 106A-106D is a lifting propeller 202A-202D. The lifting propellers 202A-202D may be any form of propeller (e.g., graphite, carbon fiber) and of a size sufficient to lift the unmanned aerial system 200 and any payload engaged by the unmanned aerial system 200 so that the unmanned aerial system 200 can navigate through the air, for example, to deliver a payload to a delivery location. For example, the lifting propellers 202A-202D may each be carbon fiber propellers having a dimension or diameter of twenty-four inches. While the illustration of FIG. 2 shows the lifting propellers 202A-202D all of a same size, in some implementations, one or more of the lifting propellers 202A-202D may be different sizes and/or dimensions. Likewise, while this example includes four lifting propellers 202A, 202B, 202C, 202D, in other implementations, more or fewer propellers may be utilized as lifting propellers. Likewise, in some implementations, the lifting propellers may be positioned at different locations on the unmanned aerial system 200. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the unmanned aerial system.

In addition to the lifting motors 106A-106D and lifting propellers 202A-202D, the unmanned aerial system 200 may also include one or more thrusting motors 106E-106F and corresponding thrusting propellers 212A-212B. The thrusting motors and thrusting propellers may be the same or different than the lifting motors 106A-106D and lifting propellers 202A-202D. For example, in some implementations, the thrusting propellers may be formed of carbon fiber and be approximately eighteen inches long. In other implementations, the thrusting motors may utilize other forms of propulsion to propel the unmanned aerial system. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 204 and central frame 207 of the unmanned aerial system 200 and utilized to increase the efficiency of flight that includes a horizontal component. For example, when the unmanned aerial system 200 is traveling in a direction that includes a horizontal component, the thrusting motors may be engaged to provide a horizontal thrust force via the thrusting propellers to propel the unmanned aerial system 200 horizontally. As a result, the speed and power utilized by the lifting motors 106A-106D may be reduced. Alternatively, in selected implementations, the thrusting motors may be oriented at an angle greater or less than ninety degrees with respect to the perimeter frame 204 and the central frame 207 to provide a combination of thrust and lift.

In the example illustrated in FIG. 2, the unmanned aerial system 200 includes two thrusting motors 106E, 106F and corresponding thrusting propellers 212A, 212B. Specifically, in the illustrated example, there is a front thrusting motor 106E coupled to and positioned near an approximate mid-point of the front wing 220. The front thrusting motor 106E is oriented such that the corresponding thrusting propeller 212A is positioned inside the perimeter frame 204. The second thrusting motor is coupled to and positioned near an approximate mid-point of the lower rear wing 224. The rear thrusting motor 106F is oriented such that the corresponding thrusting propeller 212B is positioned inside the perimeter frame 204.

While the example illustrated in FIG. 2 illustrates the unmanned aerial system with two thrusting motors 106E-106F and corresponding thrusting propellers 212A-212B, in other implementations, there may be fewer or additional thrusting motors and corresponding thrusting propellers. For example, in some implementations, the unmanned aerial system 200 may only include a single rear thrusting motor 106E or 106F and corresponding thrusting propeller 212A or 212B. In another implementation, there may be two thrusting motors and corresponding thrusting propellers mounted to the lower rear wing 224. In such a configuration, the front thrusting motor 106E may be included or omitted from the unmanned aerial system 200. Likewise, while the example illustrated in FIG. 2 shows the thrusting motors oriented to position the thrusting propellers inside the perimeter frame 204, in other implementations, one or more of the thrusting motors 106E-106F may be oriented such that the corresponding thrusting propeller 212A-212B is oriented outside of the protective frame 204.

The perimeter frame 204 provides safety for objects foreign to the unmanned aerial system 200 by inhibiting access to the lifting propellers 202A-202D from the side of the unmanned aerial system 200, provides protection to the unmanned aerial system 200, and increases the structural integrity of the unmanned aerial system 200. For example, if the unmanned aerial system 200 is traveling horizontally and collides with a foreign object (e.g., wall, building), the impact between the unmanned aerial system 200 and the foreign object will be with the perimeter frame 204, rather than a propeller. Likewise, because the frame is interconnected with the central frame 207, the forces from the impact are dissipated across both the perimeter frame 204 and the central frame 207.

The perimeter frame 204 also provides a surface upon which one or more components of the unmanned aerial system 200 may be mounted. Alternatively, or in addition thereto, one or more components of the unmanned aerial system may be mounted or positioned within the cavity of the portions of the perimeter frame 204. For example, one or more antennas may be mounted on or in the front wing 220. The antennas may be used to transmit and/or receive wireless communications. For example, the antennas may be utilized for Wi-Fi, satellite, near field communication ("NFC"), cellular communication, or any other form of wireless communication. Other components (e.g., actuators or sensors), such as imaging elements (e.g., cameras), time of flight sensors, accelerometers, inclinometers, distance-determining elements, barometers, magnetic sensors, gimbals, Global Positioning System (GPS) receiver/transmitter, radars, illumination elements, speakers, and/or any other component of the unmanned aerial system 200 or the control system of an unmanned aerial system (discussed below), etc., may likewise be mounted to or in the perimeter frame 204. Likewise, identification or reflective identifiers, such as identifiers 270, 271, 272 may be mounted to the perimeter frame 204 to aid in the identification of the unmanned aerial system 200.

In some implementations, as discussed below, one or more environmental/operational transducers 250A-250N (e.g., sensors and/or actuators) are included on the unmanned aerial system 200. The environmental/operational transducers 250A-250N may include imaging elements, such as digital still cameras, red, green, blue (RGB) cameras, video cameras, thermographic cameras, etc., mounted to (e.g., and spaced about) the frame of the unmanned aerial system 200. The environmental/operational transducers 250A-250N may include one or more distance determining elements coupled to the frame of the aerial system (e.g., vehicle). Any type of distance determining element may be utilized, including, but not limited to, a time-of-flight sensor, range finder, Sound Navigation and Ranging ("SONAR"), Light Detection and Ranging ("LIDAR"), etc.

In one embodiment, one or more of environmental/operational transducers 250A-250N includes at least one acoustic transducer (e.g., actuator and/or sensor). As illustrated, the environmental/operational transducers 250A-250N may be affixed to any portion of the frame of the unmanned aerial system 200. For example, environmental/operational transducers 250A-250N may be arranged along the front of the front wing 220, e.g., facing forward. As another example, environmental/operational transducers 250A-250N may be arranged along the underneath or lower side of the side rail 230A, e.g., facing downward. As will be appreciated, any number of environmental/operational transducers 250A-250N may be included on any portion of the frame 204 and oriented in (e.g., facing) any position. In some implementations, environmental/operational transducers 250A-250N may be positioned such that approximately all areas around the aerial system are within a field of view of at least one of the environmental/operational transducers 250A-250N.

In some implementations, the perimeter frame 204 may also include a permeable material (e.g., mesh, screen) that extends over the top and/or lower surface of the perimeter frame 204 enclosing the central frame, lifting motors, and/or lifting propellers.

A control system 214 of unmanned aerial system 200 (e.g., control system 800 in FIG. 8) is also mounted to the central frame 207. In this example, the control system 214 of unmanned aerial system 200 is mounted to the hub 208 and is enclosed in a protective barrier. The protective barrier may provide the control system 214 weather protection so that the unmanned aerial system 200 may operate in rain and/or snow without disrupting the control system 214. In some implementations, the protective barrier may have an aerodynamic shape to reduce drag when the unmanned aerial system is moving in a direction that includes a horizontal component. The protective barrier may be formed of any materials including, but not limited to, graphite-epoxy, Kevlar® brand, and/or fiberglass. In some implementations, multiple materials may be utilized. For example, Kevlar® brand materials may be utilized in areas where signals need to be transmitted and/or received.

The unmanned aerial system 200 includes one or more power modules 253. In some implementations, the power modules 253 may be positioned inside a cavity of the side rails 230A, 230B. In other implementations, the power modules 253 may be mounted or positioned at other locations of the unmanned aerial system. The power modules 253 for the unmanned aerial system may be in the form of battery power, solar power, gas power, super capacitor, fuel cell, alternative power generation source, or a combination thereof. The power module(s) are coupled to and provide power for the control system 214 of unmanned aerial system 200, the lifting motors 106A-106D, the thrusting motors 106E-106F, the environmental/operational transducers 250A-250N, the payload engagement mechanism 254, and/or other components and/or sensors of the aerial system.

In some implementations, one or more of the power modules 253 is autonomously removed and/or replaced with another power module while the unmanned aerial system is landed or in flight. For example, when the unmanned aerial system lands at a location, the unmanned aerial system may engage with a charging member at the location that will recharge the power module.

The unmanned aerial system 200 may also include a payload engagement mechanism 254 to engage and disengage items and/or containers that hold items (payload). In this example, the payload engagement mechanism 254 is positioned beneath and coupled to the hub 208 of the frame 204 of the unmanned aerial system 200. The payload engagement mechanism 254 may be of any size sufficient to securely engage and disengage a payload. In other implementations, the payload engagement mechanism 254 may operate as the container in which it contains item(s). The payload engagement mechanism 254 communicates with (e.g., via wired or wireless communication) and is controlled by the control system 214 of unmanned aerial system 200.

Figure 3:
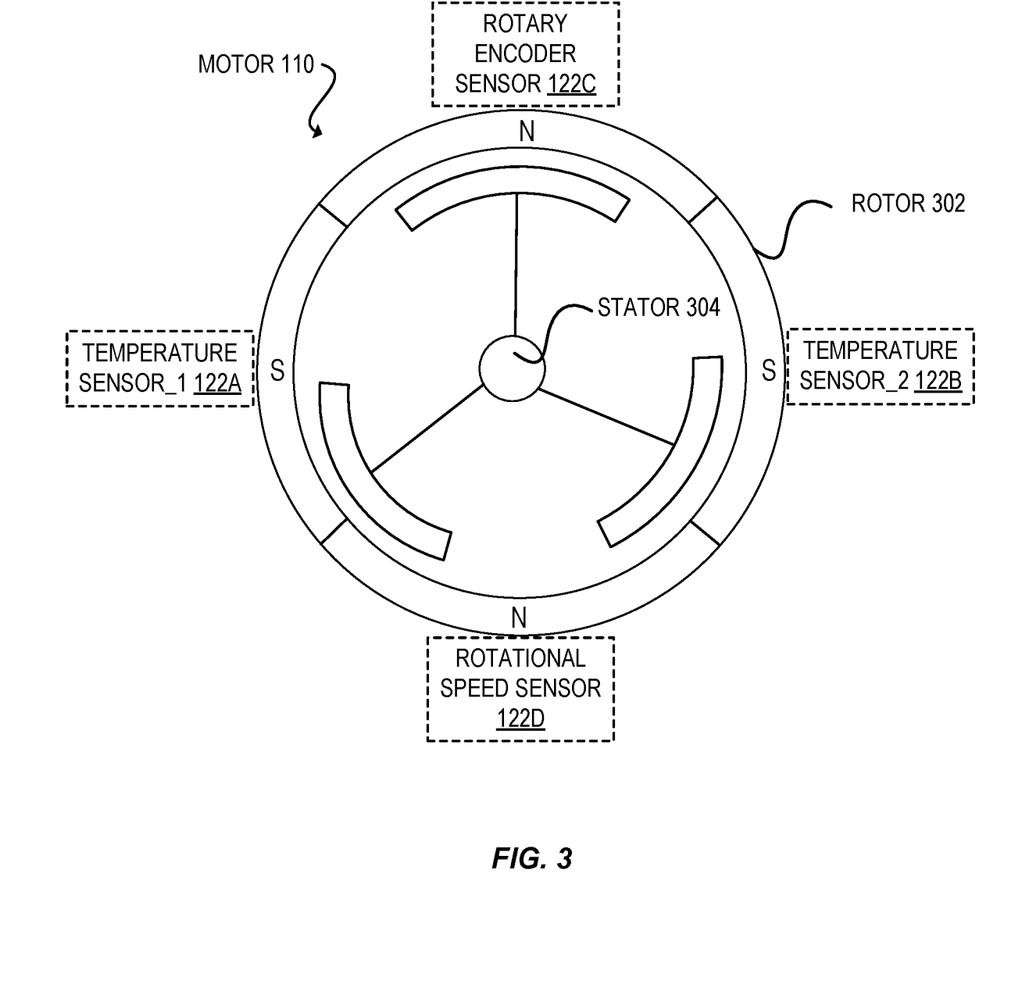
FIG. 3 depicts a three-phase motor including a plurality of sensors according to some embodiments.

FIG. 3 depicts a three-phase motor 110 including a plurality of sensors 122A-122D. according to some embodiments. In certain embodiments, one or more of motors 106A-106F is an instance of motor 110 in FIG. 3. Although two magnetic poles are shown, it should be understood that any number of poles may be utilized, e.g., 2, 4, 6, 8, 10, etc. In certain embodiments, the number of poles affects the power frequency of the motor and thus the modulation of data into the power utilizes prior knowledge of the (e.g., maximum) operating frequency of the motor to perform the embedding of data into the power and/or extracting of the data from the modulated power. Depicted motor 110 includes a cylindrical rotor 302 with two (e.g., permanent magnet) magnetic poles (each having north (N) and south (S) pairs). Depicted motor 110 includes a three-pole stator 304. Motor 110 may be a brushless direct current (DC) motor, e.g., that is operated by AC power. Applying power to stator 304 (e.g., according to the single-phase waveform in FIG. 4) is to cause relative rotation with the rotor 302, and thus to spin a propeller attached to the rotor 302 (or stator 304).

The location of the sensors in FIG. 3 are merely examples. For example, a temperature sensor may be on the stator 304 and another temperature sensor be on the rotor 302. In FIG. 3, motor 110 includes a first temperature sensor 122A, a second temperature sensor 122B (e.g., on a different part of the motor from first temperature sensor 122A), a rotary encoder sensor 122C (for example, to indicate the relative rotational angle/motion between the rotor 302 and stator 304, e.g., to provide the electronic commutation to control the current in the stator windings to cause the requested operation of the motor), and rotational speed sensor (e.g., to determine the revolutions per minute (RPM) of the motor 110). Any one or combination of the sensors may be used for a motor. Other sensor(s) may be utilized. The data from the sensor(s) may be transmitted on the power waveform that is powering the motor.

Figure 4:
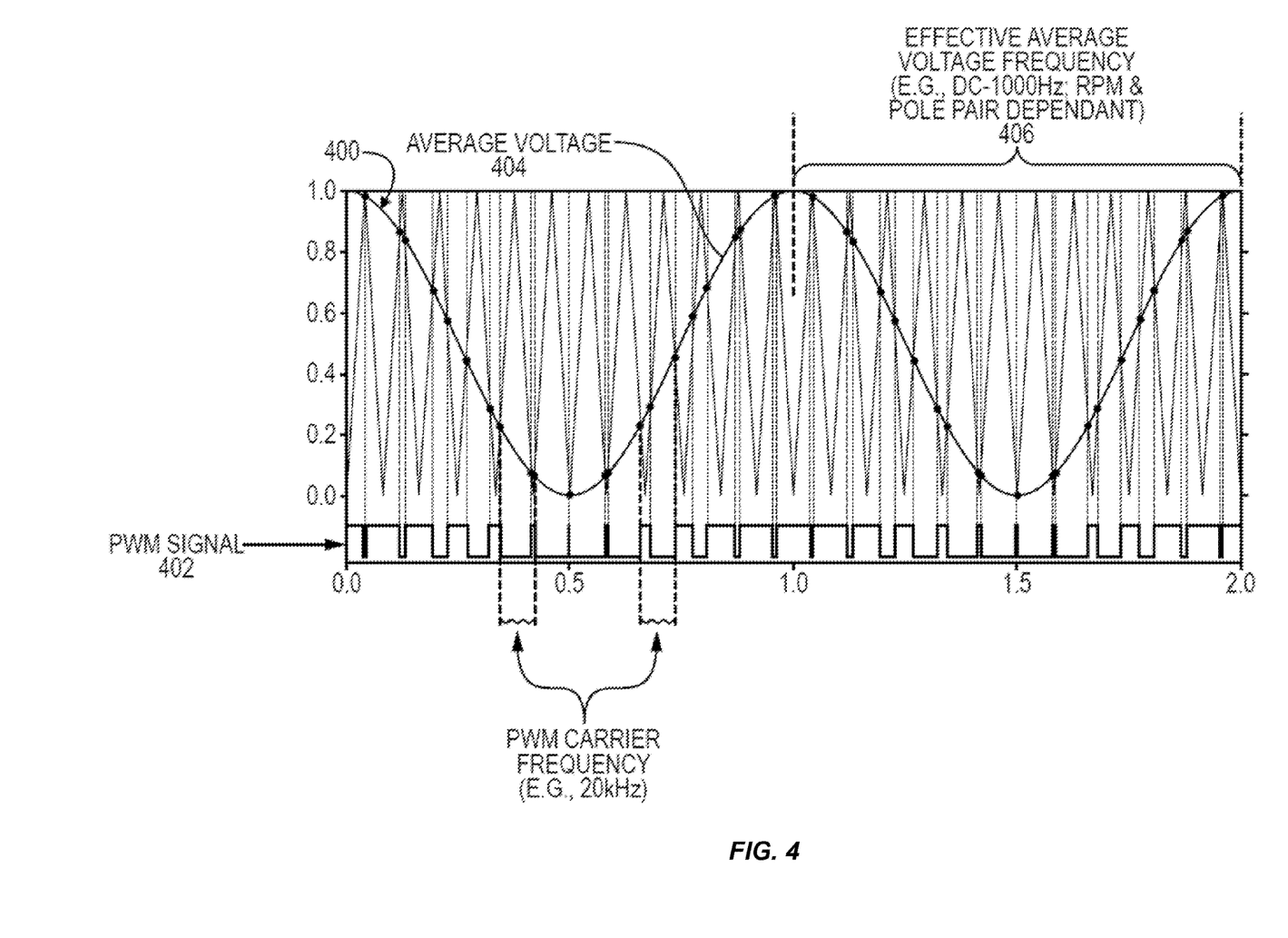
FIG. 4 is a wave form diagram illustrating example motor control for one phase of a three-phase motor according to some embodiments.

FIG. 4 is a wave form diagram illustrating example motor control 400 for one phase of a three-phase motor according to some embodiments. Motor control 400 is a sine wave formed from pulse width modulated (PWM) waveform 402 on PWM carrier frequency (e.g., 20 kHz). For example, with the width of each pulse of pulse width modulated (PWM) waveform 402 corresponding to the average voltage 404 provided over each of those cycles. Motor control 400 includes a cycle 406 at the current power frequency for a motor, e.g., produced by power generation circuitry 114. As discussed herein, in certain embodiments the data to be carried by motor control 400 is modulated at a frequency greater than that of the PWM waveform 402 (e.g., 20 kHz) and that of the frequency of the motor control 400 (e.g., about DC 1000 Hz).

Figure 5:
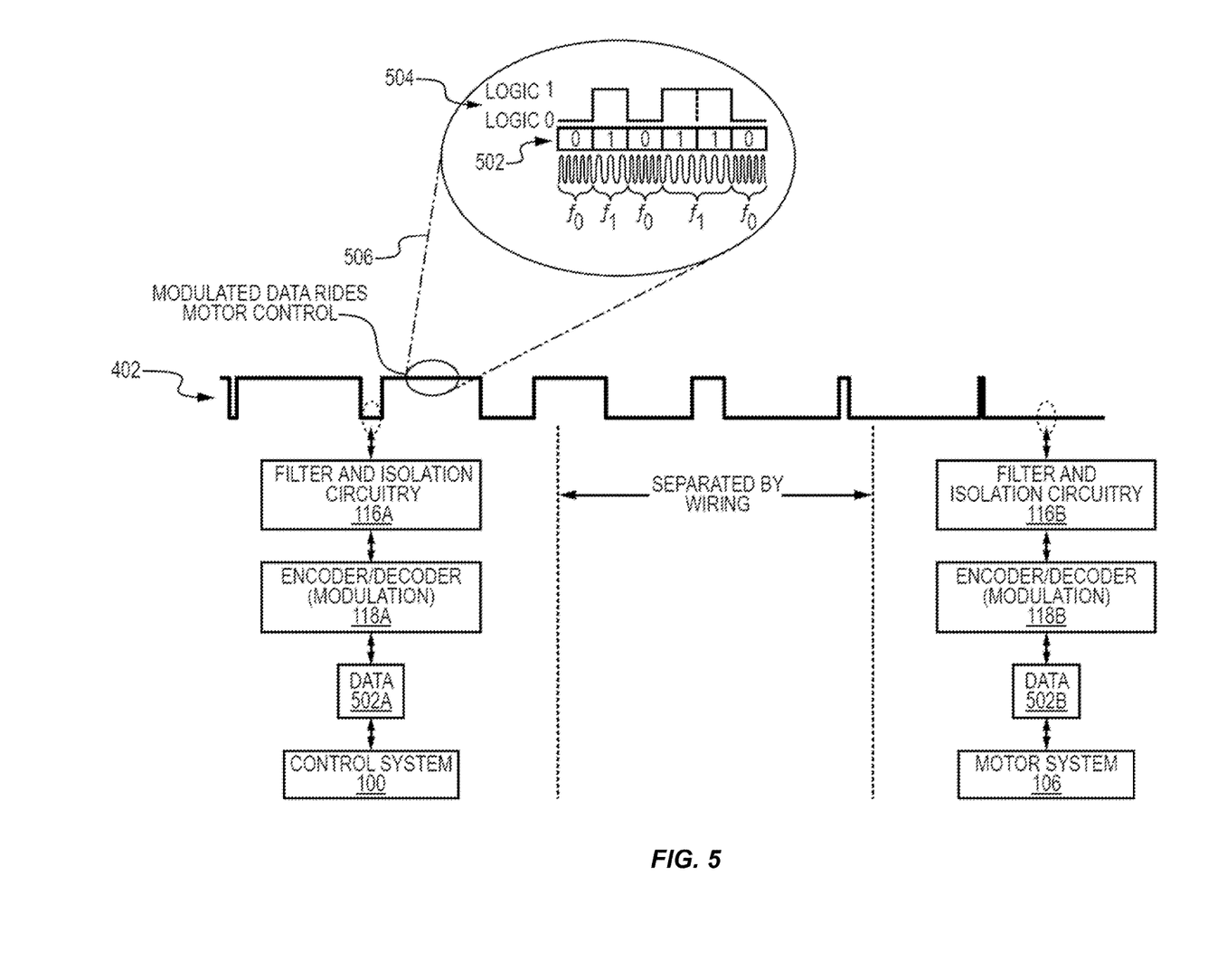
FIG. 5 is a wave form diagram showing data riding on the motor control according to some embodiments.

FIG. 5 is a wave form diagram showing data 502 riding on the motor (e.g., drive) control (e.g., shown in the PWM waveform 402) according to some embodiments. In FIG. 5, binary data 502 is converted to a (e.g., square) data waveform 504. In certain embodiments, the data waveform 504 is modulated to ride on the motor control (e.g., sinusoid waveform 400 in FIG. 4 or PWM waveform 402 version of the sinusoid waveform 400). In one embodiment, the binary ones of the data 502 are modulated to a mark frequency $f_1$ and the binary zeroes at a different, space frequency $f_0$ shown in waveform 506. In certain embodiments, waveform 506 is then embedded into the motor control (e.g., sinusoid waveform 400 in FIG. 4 or PWM waveform 402 version of the sinusoid waveform 400). As one example, binary data 502 is the data 502B from motor system 106 (e.g., from a sensor instance of transducer 122), that data (e.g., waveform 506) is embedded into motor control by encoder/decoder circuit 118B via coupling circuitry (e.g., shown as a dotted oval). In one embodiment, the modulated power is filtered and/or isolated by filter and isolation circuitry 116B. In this example, modulated power is sensed by coupling circuitry (e.g., shown as a dotted oval). In one embodiment, the modulated power is filtered and/or isolated by filter and isolation circuitry 116A to begin the extraction operations. In this example, encoder/decoder circuit 118B is to extract the data 502A (e.g., which should be substantially or exactly the same as data 502 that was transmitted over the power wiring). In certain embodiments, the data 502A is used by the control system 100 (e.g., by an electronic speed controller 102 of the control system 100 to control a motor of motor system 106). In certain embodiments, the modulation is added to the motor control (e.g., sinusoid waveform 400 in FIG. 4 or PWM waveform 402 version of the sinusoid waveform 400) only within a proper subset of its time, for example, only within one or more of the longest dwell/duty cycles and/or the one or more of the shortest dwell/duty cycles.

Figure 6:
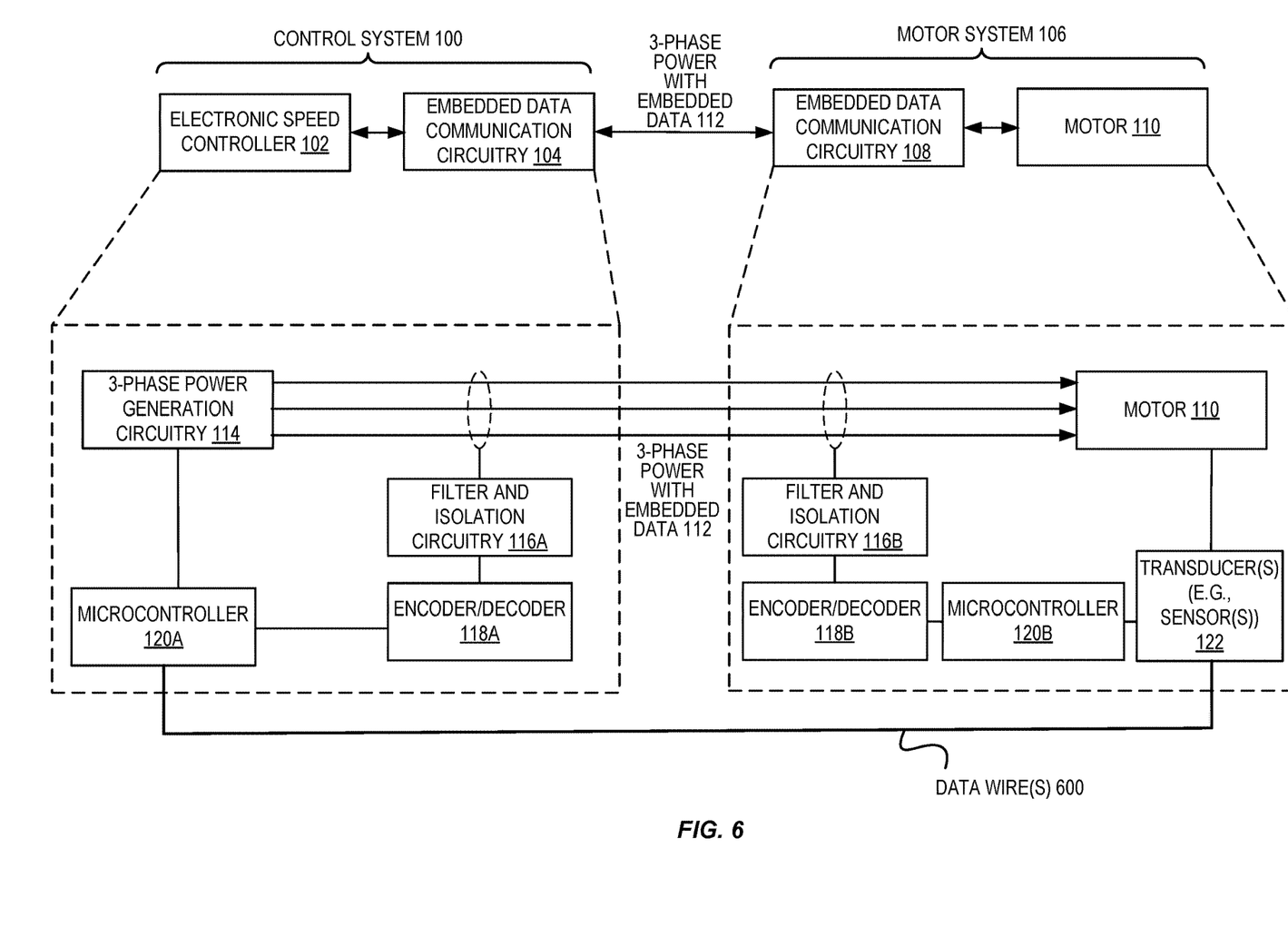
FIG. 6 is a control system coupled to a motor system for power with embedded data as redundancy to data from data wire(s) according to some embodiments.

FIG. 6 is a control system 100 coupled to a motor system 106 for power with embedded data as redundancy to data from data wire(s) 600 according to some embodiments. In comparison to FIG. 1, FIG. 6 includes one or more wires that are dedicated to (e.g., only) send data (and not power to a motor), for example, data from transducer(s) 122 to control system 100 (e.g., to microcontroller 120A of control system 100). In certain embodiments, the data sent as embedded data with power 112 is redundant to the data on wire(s) 600. In one embodiment, the microcontroller 120A compares the data sent as embedded data with power 112 to the data on wire(s) 600 and makes a decision when those data values do not match. For example, data (e.g., outside of nominal for a transducer) received on wire(s) 600 may not be used by microcontroller 120A when the data sent as embedded data of power 112 is nominal.

Figure 7:
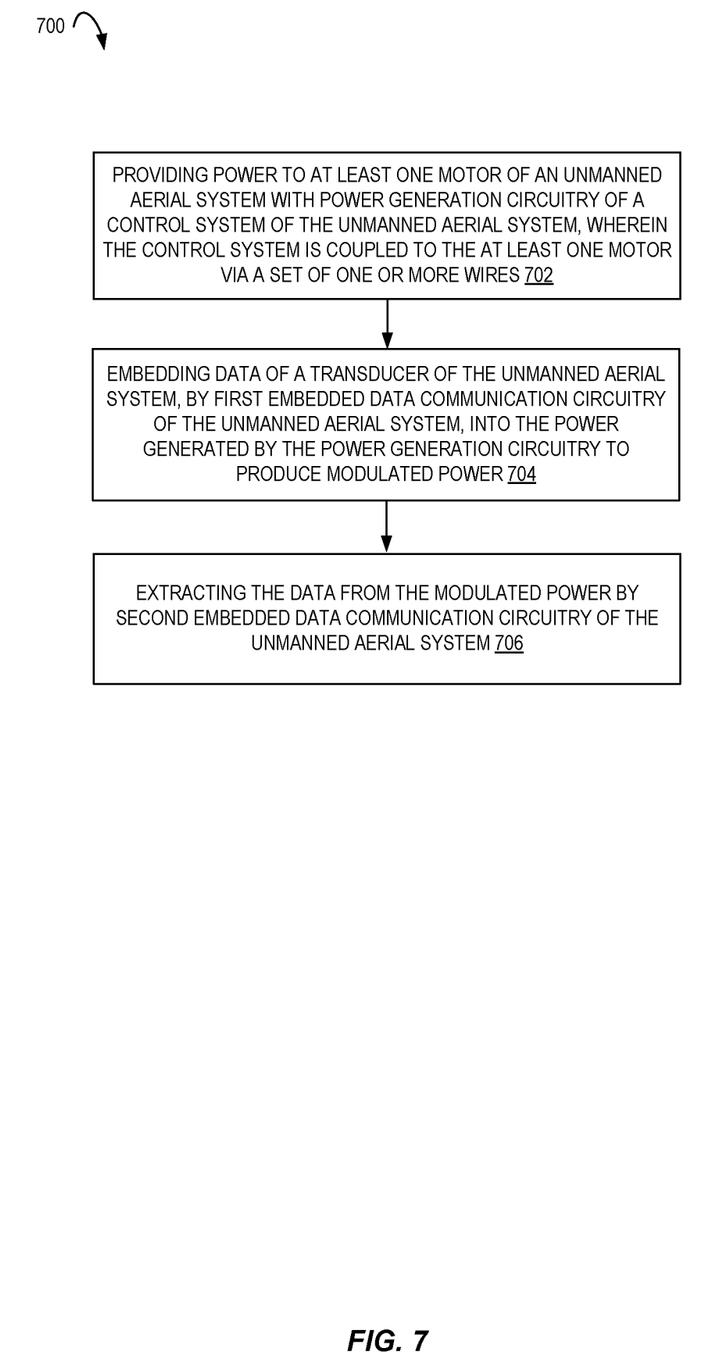
FIG. 7 is a flow diagram illustrating the embedding and use of data in the power sent by a control system to a motor system in an unmanned aerial system according to some embodiments.

FIG. 7 is a flow diagram 700 illustrating the embedding and use of data in the power sent by a control system to a motor system in an unmanned aerial system according to some embodiments. Depicted flow diagram 700 includes providing power to at least one motor of an unmanned aerial system with power generation circuitry of a control system of the unmanned aerial system, wherein the control system is coupled to the at least one motor via a set of one or more wires 702, embedding data of a transducer of the unmanned aerial system, by first embedded data communication circuitry of the unmanned aerial system, into the power generated by the power generation circuitry to produce modulated power 704, and extracting the data from the modulated power by second embedded data communication circuitry of the unmanned aerial system 706.

Figure 8:
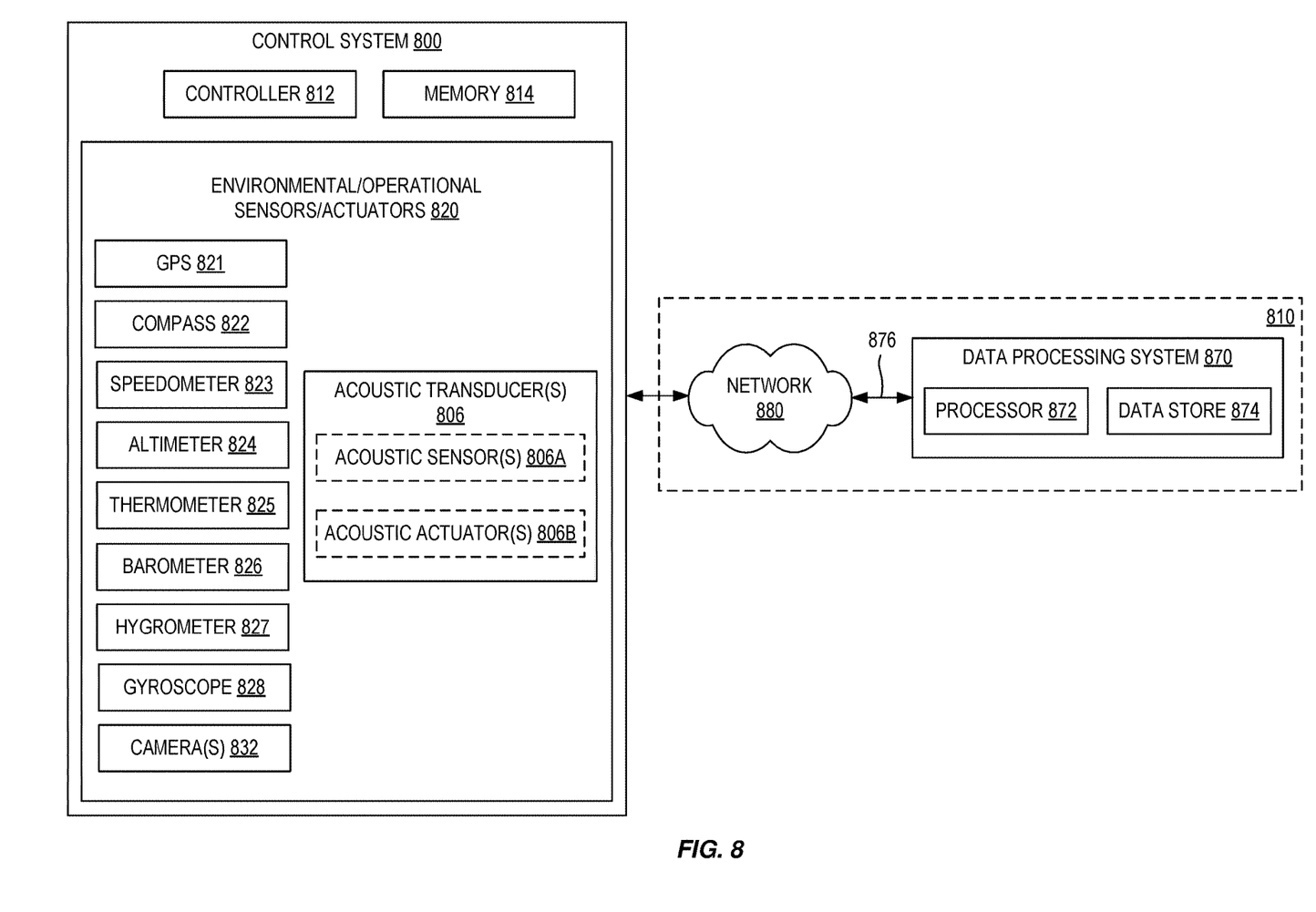
FIG. 8 is a block diagram depicting a control system of an unmanned aerial system according to some embodiments.

FIG. 8 is a block diagram depicting a control system 800 of an unmanned aerial system according to some embodiments. Optionally, control system 800 may be coupled to external resources 810 via a network 880. The control system 800 includes a controller 812 (e.g., processor), a memory 814 (e.g., coupled to the controller), and a plurality of environmental or operational sensors/actuators 820 that includes at least one acoustic transducer(s) 806 (e.g., coupled to the controller 812). Acoustic transducer(s) 806 may include an acoustic (e.g., sound) sensor(s) 806A and/or acoustic (e.g., sound) actuator(s) 806B. A transducer may be a piezoelectric transducer. In certain embodiments, control system 800 includes one or more components of control system 100, e.g., for the embedding of data into and/or extraction of data from power used (e.g., AC power generated onboard from a DC power source).

In one embodiment, the controller is to perform any of the operations discussed herein, e.g., for embedding of data. The controller may be a processor that performs computing functions. For example, the controller 812 may control any aspects of the operation of the control system 800 and the one or more computer-based components thereon, e.g., including the plurality of environmental or operational sensors/actuators 820. The controller 812 may generate control values for conducting operations thereof, e.g., for operating one or more rotors, motors, rudders, ailerons, flaps or other components of an unmanned aerial system. Such control systems may be associated with one or more other computing devices or machines, and may communicate with the data processing system 870 or one or more other computer devices over the network 880, through the sending and receiving of data. The control system 800 further includes one or more memory (e.g., storage) components 814 for storing any type of information or data, e.g., code for operating an unmanned aerial system (e.g., based on delay time or other range finding) and/or information or data detected by one or more of the environmental or operational sensors/actuators 820 (e.g., acoustic sensor(s) 806A and/or acoustic actuator(s) 806B).

The control system 800 may communicate through one or more wireless connections (e.g., wireless protocols or networks, such as Global System for Mobile Communications (GSM) network, a Code Division Multiple Access (CDMA) network, a Long Term Evolution (LTE) network, Bluetooth® or any Wireless Fidelity (or "Wi-Fi") protocol) over the network 880 or directly.

The environmental or operational sensors/actuators 820 may include any components or features for determining one or more attributes of an environment in which the unmanned aerial system being controlled by control system 800 is operating, or may be expected to operate, including extrinsic information or data or intrinsic information or data. As is shown in FIG. 8, the environmental or operational sensors/actuators 820 may include, but are not limited to, a Global Positioning System ("GPS") receiver or sensor 821, a compass 822, a speedometer 823, an altimeter 824, a thermometer 825, a barometer 826, a hygrometer 827, a gyroscope 828, and/or camera(s) 832. The GPS sensor 821 may be any device, component, system or instrument adapted to receive signals (e.g., trilateration data or information) relating to a position of the unmanned aerial system being controlled by control system 800 from one or more GPS satellites of a GPS network, e.g., separate from use of an acoustic transducer for range finding. The compass 822 may be any device, component, system, or instrument adapted to determine one or more directions with respect to a frame of reference that is fixed with respect to the surface of the Earth (e.g., a pole thereof). The speedometer 823 may be any device, component, system, or instrument for determining a speed or velocity of the unmanned aerial system being controlled by control system 800, and may include related components such as pitot tubes, accelerometers, or other features for determining speeds, velocities, or accelerations.

The altimeter 824 may be any device, component, system, or instrument for determining an altitude of the unmanned aerial system being controlled by control system 800, and may include any number of barometers, transmitters, receivers, range finders (e.g., laser or radar) or other features for determining heights. The thermometer 825, the barometer 826, and the hygrometer 827 may be any devices, components, systems, or instruments for determining local air temperatures, atmospheric pressures, or humidities within a vicinity of the unmanned aerial system being controlled by control system 800. The gyroscope 828 may be any mechanical or electrical device, component, system, or instrument for determining an orientation, e.g., the orientation of the unmanned aerial system being controlled by control system 800. For example, the gyroscope 828 may be a mechanical gyroscope having at least a pair of gimbals and a flywheel or rotor. Alternatively, the gyroscope 828 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the unmanned aerial system being controlled by control system 800. The camera 832 may be any type or form of camera, e.g., such as digital still cameras, red, green, blue (RGB) cameras, video cameras, or thermographic cameras. An acoustic transducer 806 may be a transducer (e.g., a dynamic microphone, a condenser microphone, a ribbon microphone, a crystal microphone) that converts acoustic energy of any intensity and across any or all frequencies into one or more electrical signals, and may include any number of diaphragms, magnets, coils, plates, or other like features for detecting and recording such energy. The acoustic transducer 806 may also be provided as a discrete component, or in combination with one or more other components, e.g., an imaging device, such as a digital camera. Furthermore, an acoustic transducer 806 may detect and record acoustic energy (e.g., waves) from any and all directions.

In certain embodiments, the environmental or operational sensors/actuators 820 include any type or form of device or component for determining an environmental condition within a vicinity of the unmanned aerial system being controlled by control system 800 in accordance with the present disclosure. For example, the environmental or operational sensors/actuators 820 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), altitude indicators, depth gauges, accelerometers or the like, as well as one or more imaging devices (e.g., digital cameras), and are not limited to the sensors/actuators shown in FIG. 8.

The optional data processing system 870 includes one or more data stores 874, as well as one or more computer processors 872 provided for any specific or general purpose. For example, the data processing system 870 of FIG. 8 may be independently provided for the exclusive purpose of receiving, analyzing or storing acoustic data (e.g., sounds), propeller blade treatment positions, corresponding lifting forces, anti-sounds, and/or other information or data received from the control system 800 or, alternatively, provided in connection with one or more physical or virtual services that receive, analyze or store such sounds, information or data, as well as one or more other functions. The processor(s) 872 may be coupled to or otherwise communicate the data stores 874. The data stores 874 may store any type of information or data, including but not limited to sound information or data, and/or information or data regarding environmental conditions, operational characteristics, or positions, for any purpose. The computer processor(s) 872 may also connect to or otherwise communicate with the network 880, as indicated by line 876, through the sending and receiving of data. For example, the data processing system 870 may include any facilities, stations or locations having the ability or capacity to receive and store information or data, such as media files, in one or more data stores, e.g., media files received from the control system 800, or from one another, or from one or more other external computer systems via the network 880. In some implementations, the data processing system 870 may be provided in a physical location. In other such implementations, the data processing system 870 may be provided in one or more alternate or virtual locations, e.g., in a "cloud" based environment.

The network 880 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

In certain embodiments, the computers, devices and the like described herein have the necessary electronics, software, memory, storage, databases, firmware, logic/state machines, microprocessors, communication links, displays, or other visual or audio user interfaces, printing devices, and any other input/output interfaces to provide any of the functions or services described herein and/or achieve the results described herein. Also, those of ordinary skill in the pertinent art will recognize that users of such computers, UAS, devices, and the like may operate a keyboard, keypad, mouse, stylus, touch screen, or other device or method to interact with the computers, UAS, and the like, or to "select" an item, link, node, hub or any other aspect of the present disclosure.

The control system 800 or the data processing system 870 may use any web-enabled or Internet applications or features, or any other client-server applications or features including E-mail or other messaging techniques, to connect to the network 880, or to communicate with one another, such as through short or multimedia messaging service (SMS or MMS) text messages. For example, the control system 800 may transmit information or data in the form of synchronous or asynchronous messages to the data processing system 870 or to any other computer device in real time or in near-real time, or in one or more offline processes, via the network 880.

The data and/or computer executable instructions, programs, firmware, software and the like (also referred to herein as "computer executable" components) described herein may be stored on a non-transitory, computer-readable medium that is within or accessible by computers or computer components such as the controller 812 or the processor 872, or any other computers or control systems utilized by the control system 800 or the data processing system 870, and having sequences of instructions which, when executed by a processor (e.g., a central processing unit, or "CPU"), cause the processor to perform all or a portion of the functions, services, and/or methods described herein. Such computer executable instructions, programs, software, and the like may be loaded into the memory of one or more computers using a drive mechanism associated with the computer readable medium, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program to access, or include signals that may be downloaded through the Internet or other networks.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 106A to 106F) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An unmanned aerial system comprising:
   an actuator;
   a control system comprising alternating current power generation circuitry and first embedded data communication circuitry; and
   a motor system coupled to the control system via a set of one or more wires and comprising at least one motor to provide propulsion from power generated by the alternating current power generation circuitry and second embedded data communication circuitry to embed control data to control the actuator into the power generated by the alternating current power generation circuitry to produce modulated power, wherein the first embedded data communication circuitry is to extract the control data from the modulated power.

2. The unmanned aerial system of claim 1, wherein the modulated power is a plurality of phases of the power.

3. The unmanned aerial system of claim 1, further comprising a second set of one or more wires dedicated only to sending the control data from the control system to the actuator.

4. An unmanned aerial system comprising:
   a transducer;
   a control system comprising power generation circuitry and first embedded data communication circuitry; and
   a motor system coupled to the control system via a set of one or more wires and comprising at least one motor, powered by power generated by the power generation circuitry, and second embedded data communication circuitry, wherein one of the first embedded data communication circuitry and the second embedded data communication circuitry is to embed control data of the transducer into the power generated by the power generation circuitry to produce modulated power, and the other of the first embedded data communication circuitry and the second embedded data communication circuitry is to extract the control data from the modulated power.

5. The unmanned aerial system of claim 4, wherein the transducer comprises a sensor, and the second embedded data communication circuitry is to embed output data from the sensor into the power generated by the power generation circuitry to produce the modulated power, and the first embedded data communication circuitry is to extract the output data from the modulated power.

6. The unmanned aerial system of claim 5, wherein the control system is to control the power generation circuitry based at least in part on the extracted output data.

7. The unmanned aerial system of claim 5, wherein the transducer further comprises an actuator, and the first embedded data communication circuitry is to embed the control data to control the actuator into the power generated by the power generation circuitry to produce the modulated power, and the second embedded data communication circuitry is to extract the control data from the modulated power.

8. The unmanned aerial system of claim 7, wherein the motor system is to control the actuator based at least in part on the extracted control data.

9. The unmanned aerial system of claim 4, wherein the transducer comprises an actuator, and the first embedded data communication circuitry is to embed the control data to control the actuator into the power generated by the power generation circuitry to produce the modulated power, and the second embedded data communication circuitry is to extract the control data from the modulated power.

10. The unmanned aerial system of claim 4, wherein the modulated power is a plurality of phases of the power.

11. The unmanned aerial system of claim 10, wherein each phase of the plurality of phases of the power includes a respective value of the control data.

12. The unmanned aerial system of claim 4, further comprising a second set of one or more wires dedicated to data transmittal to send the control data between the transducer and the control system.

13. A computer-implemented method comprising:
    providing power to at least one motor of an unmanned aerial system with power generation circuitry of a control system of the unmanned aerial system, wherein the control system is coupled to the at least one motor via a set of one or more wires;
    embedding control data of a transducer of the unmanned aerial system, by first embedded data communication circuitry of the unmanned aerial system, into the power generated by the power generation circuitry to produce modulated power; and
    extracting the control data from the modulated power by second embedded data communication circuitry of the unmanned aerial system.

14. The computer-implemented method of claim 13, wherein the transducer comprises a sensor, the embedding comprises embedding output data from the sensor into the power generated by the power generation circuitry to produce the modulated power, and the extracting comprises extracting the output data from the modulated power.

15. The computer-implemented method of claim 14, further comprising controlling the power generation circuitry, with the control system, based at least in part on the extracted output data.

16. The computer-implemented method of claim 14, wherein the transducer further comprises an actuator, the embedding comprises embedding the control data to control the actuator into the power generated by the power generation circuitry to produce the modulated power, and the extracting comprises extracting the control data from the modulated power.

17. The computer-implemented method of claim 16, further comprising controlling the actuator at least in part with the extracted control data.

18. The computer-implemented method of claim 13, wherein the transducer comprises an actuator, the embedding comprises embedding the control data to control the actuator into the power generated by the power generation circuitry to produce the modulated power, and the extracting comprises extracting the control data from the modulated power.

19. The computer-implemented method of claim 13, wherein the embedding comprises embedding the control data into each phase of a plurality of phases of the power.

20. The computer-implemented method of claim 13, further comprising sending the control data between the transducer and the control system on a second set of one or more wires dedicated to data transmittal.

\* \* \* \* \*